(12) United States Patent
Song et al.

(10) Patent No.: US 12,327,042 B2
(45) Date of Patent: Jun. 10, 2025

(54) SECURING DYNAMIC RANDOM ACCESS MEMORY (DRAM) CONTENTS TO NON-VOLATILE IN A PERSISTENT MEMORY MODULE

(71) Applicant: Rambus Inc., San Jose, CA (US)

(72) Inventors: Taeksang Song, San Jose, CA (US); Evan Lawrence Erickson, Chapel Hill, NC (US); Craig E. Hampel, Los Altos, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/139,190

(22) Filed: Apr. 25, 2023

(65) Prior Publication Data
US 2023/0350603 A1    Nov. 2, 2023

Related U.S. Application Data

(60) Provisional application No. 63/336,014, filed on Apr. 28, 2022.

(51) Int. Cl.
G06F 3/06          (2006.01)

(52) U.S. Cl.
CPC .......... G06F 3/0658 (2013.01); G06F 3/0622 (2013.01); *G06F 3/0619* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,753,828 B1* | 9/2017 | Crow | G06F 3/0656 |
| 9,785,365 B1* | 10/2017 | Shallal | G06F 12/0868 |
| 10,121,022 B1* | 11/2018 | McNutt | G06F 3/0673 |
| 10,310,995 B1* | 6/2019 | Malygin | G06F 13/1605 |
| 10,628,073 B1* | 4/2020 | Zhao | G06F 3/0608 |
| 2001/0025340 A1* | 9/2001 | Marchant | G06F 21/6272 |
| | | | 713/150 |
| 2008/0288785 A1* | 11/2008 | Rao | G06F 21/72 |
| | | | 711/E12.092 |
| 2014/0310536 A1* | 10/2014 | Shacham | G06F 21/78 |
| | | | 713/193 |

(Continued)

FOREIGN PATENT DOCUMENTS

| | | | | |
|---|---|---|---|---|
| CN | 101689230 A | * | 3/2010 | .......... G06F 11/1402 |
| CN | 109597773 A | * | 4/2019 | ............. G06F 12/16 |

OTHER PUBLICATIONS

Microsoft, "Computer Dictionary", Fifth Edition, 2002, p. 488 (Year: 2002).*

(Continued)

*Primary Examiner* — Christopher D Birkhimer
(74) *Attorney, Agent, or Firm* — Lowenstein Sandler LLP (57) ABSTRACT

Technologies for securing dynamic random access memory contents to non-volatile memory in a persistent memory module are described. One persistent memory module includes an inline memory encryption (IME) circuit that receives a data stream from a host, encrypts the data stream into encrypted data, and stores the encrypted data in DRAM. A management processor transfers the encrypted data from the DRAM to persistent storage memory responsive to a signal associated with a power-loss or power-down event.

20 Claims, 5 Drawing Sheets

(56) References Cited

U.S. PATENT DOCUMENTS

| | | | | |
|---|---|---|---|---|
| 2015/0106556 | A1* | 4/2015 | Yu | G06F 12/0246 |
| | | | | 711/103 |
| 2015/0169238 | A1* | 6/2015 | Lee | G06F 12/0871 |
| | | | | 711/103 |
| 2015/0363107 | A1* | 12/2015 | Best | G11C 7/1093 |
| | | | | 711/105 |
| 2016/0011816 | A1* | 1/2016 | Aizman | G06F 3/0685 |
| | | | | 711/117 |
| 2016/0342487 | A1* | 11/2016 | Ware | G06F 3/0647 |
| 2017/0003899 | A1* | 1/2017 | Raja | G06F 11/14 |
| 2017/0353305 | A1* | 12/2017 | Glickman | G06F 21/75 |
| 2018/0088804 | A1* | 3/2018 | Mummidi | G06F 3/0659 |
| 2018/0137062 | A1* | 5/2018 | Awad | G06F 12/0802 |
| 2018/0260339 | A1* | 9/2018 | Shallal | G06F 12/1408 |
| 2019/0146931 | A1* | 5/2019 | Frolikov | G06F 3/0679 |
| | | | | 713/193 |
| 2019/0188079 | A1* | 6/2019 | Kohli | G06F 11/1076 |
| 2019/0205267 | A1* | 7/2019 | Richey | G06F 3/0665 |
| 2019/0227718 | A1* | 7/2019 | Frolikov | G06F 3/0659 |
| 2019/0227921 | A1* | 7/2019 | Frolikov | G06F 9/5016 |
| 2019/0245689 | A1* | 8/2019 | Eckel | G06F 21/74 |
| 2019/0303033 | A1* | 10/2019 | Noguera Serra | G06F 3/061 |
| 2020/0004636 | A1* | 1/2020 | Secatch | G06F 12/0246 |
| 2020/0042456 | A1* | 2/2020 | Lee | G06F 11/108 |
| 2020/0118636 | A1* | 4/2020 | Athreya | G11C 16/3427 |
| 2020/0310662 | A1* | 10/2020 | Staab | G06F 21/44 |
| 2020/0356285 | A1* | 11/2020 | Pan | G06F 3/0658 |
| 2021/0081138 | A1* | 3/2021 | Park | G06F 3/0656 |
| 2021/0103653 | A1* | 4/2021 | Numata | G06F 3/0658 |
| 2021/0117360 | A1* | 4/2021 | Kutch | G06F 3/0656 |
| 2021/0132863 | A1* | 5/2021 | Ji | G11C 11/5628 |
| 2021/0223979 | A1* | 7/2021 | Li | G06F 3/064 |
| 2021/0227268 | A1* | 7/2021 | Di Pietro | H04N 21/23476 |
| 2021/0234673 | A1* | 7/2021 | Kurian | H04L 9/3234 |
| 2021/0234693 | A1* | 7/2021 | Kurian | H04L 9/088 |
| 2021/0234868 | A1* | 7/2021 | Kurian | H04L 9/3213 |
| 2021/0240366 | A1* | 8/2021 | Ishida | H04L 9/0822 |
| 2021/0240389 | A1* | 8/2021 | Sela | G06F 12/1408 |
| 2021/0312057 | A1* | 10/2021 | Kloth | G06F 3/0623 |
| 2021/0357119 | A1* | 11/2021 | Bruce | G06F 3/061 |
| 2021/0357148 | A1* | 11/2021 | Sela | G06F 3/0653 |
| 2022/0253380 | A1* | 8/2022 | Lee | G06F 12/08 |
| 2022/0294883 | A1* | 9/2022 | Pope | H04L 47/34 |
| 2022/0391107 | A1* | 12/2022 | Mallick | G06F 3/067 |
| 2023/0030286 | A1* | 2/2023 | Abali | G06F 12/0804 |

OTHER PUBLICATIONS

Jason Landry, "What Is Hardware Root of Trust?", Jul. 22, 2019, pp. 1-12, https://www.dell.com/en-us/blog/hardware-root-trust/ (Year: 2019).*

Akeyless, "Root of Trust", Jun. 19, 2021, pp. 1-6, https://web.archive.org/web/20210619083155/https://www.akeyless.io/secrets-management-glossary/root-of-trust/ (Year: 2021).*

Michael Hay, "Ask a Professor: Does Double Encryption Strengthen Security?", 2019, pp. 1-4, https://news.colgate.edu/magazine/2019/05/16/does-double-encryption-strengthen-security-michael-hay/ (Year: 2019).*

Shafiee, Ali et al., "Secure DIMM: Moving ORAM Primitives Closer to Memory", IEEE International Symposium on High Performance Computer Architecture, 2018, 13 pages.

* cited by examiner

SECURING DYNAMIC RANDOM ACCESS MEMORY (DRAM) CONTENTS TO NON-VOLATILE IN A PERSISTENT MEMORY MODULE

RELATED APPLICATION

This application claims the benefit of Provisional Application No. 63/336,014, filed Apr. 28, 2022, the entire contents of which are hereby incorporated by reference.

BACKGROUND

Modern computer systems generally include one or more memory devices, such as on a memory module. The memory module may include, for example, one or more random access memory (RAM) devices or dynamic random access memory (DRAM) devices. A memory device can include memory banks made up of memory cells that a memory controller or memory client accesses through a command interface and a data interface within the memory device. The memory module can be a persistent memory module with one or more non-volatile memory (NVM) devices.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

In general, DRAM contents should only be accessible by a host via a host memory interface. In a conventional NVM module with DRAM and persistent storage memory, the DRAM contents can be transferred to the persistent storage memory in the event of a power-loss event or a power-down event. To ensure the security of the data at rest, the DRAM contents can be encrypted by an encryption logic integrated into an external NVM controller before being stored in the persistent storage memory. For example, when a server is about to power down, the server sends a notification signal like global persistent flush (GPF) or power disappear (PWRDIS) through a command interface to a management processor. This signal triggers an NVM backup process by the management processor to back up the DRAM contents to its persistent storage memory to avoid losing any data. A problem arises in the conventional NVM module because the management processor should be restricted from accessing the DRAM contents for security. Still, in this case, the management processor would have read access to handle transfer data from the DRAM to the persistent storage memory, causing security issues since the DRAM contents are unencrypted. Another problem with the conventional NVM module is that DRAM contents can be leaked by probing lines between the management processor and the external NVM controller.

Aspects of the present disclosure and embodiments address these problems and others by providing a memory module with persistent memory backup capability where the data stream is encrypted by an inline memory encryption (IME) circuit and stored in DRAM. A management processor can transfer the encrypted data from the DRAM to the persistent storage memory when a signal is applied to the management processor, such as in response to a power-down event or a power-loss event. When transferring data to the persistent storage memory, the unencrypted data (e.g., plain text data) is accessible to the host and is not accessible by the management processor. That is, the host's data can be transferred to the persistent storage memory securely without being accessible by the management processor and without exposing the host's data on lines to an external NVM controller.

Aspects of the present disclosure and embodiments can enhance module security compared to simply encrypting user data using encryption logic in an NVM controller. Aspects of the present disclosure and embodiments can restrict read access to unencrypted user data by a management processor since only a host should be able to read DRAM contents via a memory interface (e.g., CXL.mem). Aspects of the present disclosure and embodiments can prevent unencrypted data (e.g., plain text or cleartext user data) from leaving an integrated circuit (e.g., a System on Chip (SoC)) with a memory controller and the management processor. Aspects of the present disclosure and embodiments can provide encryption within the integrated circuit to allow an external NVM controller without exposing the unencrypted data (e.g., plain text)) or encrypted data with a reduced level of encryption to the management processor or external components, such as the NVM controller.

Aspects of the present disclosure and embodiments can be used in a memory module that supports a remote memory protocol, such as Compute Express Link (CXL) protocol, Gen-Z, Open Memory Interface (OMI), Open Coherent Accelerator Processor Interface (OpenCAPI), or the like. In at least one embodiment, the memory module can be a CXL NVM module with secure backup capabilities. The CXL NVM module can include a CXL controller or a CXL memory expansion device (e.g., CXL memory expander System on Chip (SoC)) that is coupled to DRAM (e.g., one or more volatile memory devices) and persistent storage memory (e.g., one or more NVM devices). The CXL memory expansion device can include a management processor that should not be allowed access to a host's unencrypted data. The CXL memory expansion device can use an encryption circuit, such as an IME circuit, to encrypt the host's unencrypted data before storing it in the DRAM. When a server is about to power down (e.g., a power-down event) or power loss to the CXL memory module is imminent, the CXL memory module can require that the DRAM contents be persisted to non-volatile memory. For example, the server can send a notification signal, like a GPF signal/command, PWRDIS signal/command to the CXL memory module through a management interface, such as CXL.io, a management bus (e.g., SMBus), or a dedicated pin. For example, PWRDIS can be a dedicated pin that indicates a power disappearing event generated by a server system. The notification signal causes a backup of the encrypted DRAM contents to the persistent memory. This signal triggers an NVM backup process by the management processor to back up the encrypted DRAM contents to its persistent storage memory to avoid losing any data without causing security issues since the DRAM contents are encrypted, and the DRAM contents are not leaked by probing lines between the management processor and the external NVM controller.

Figure 1:
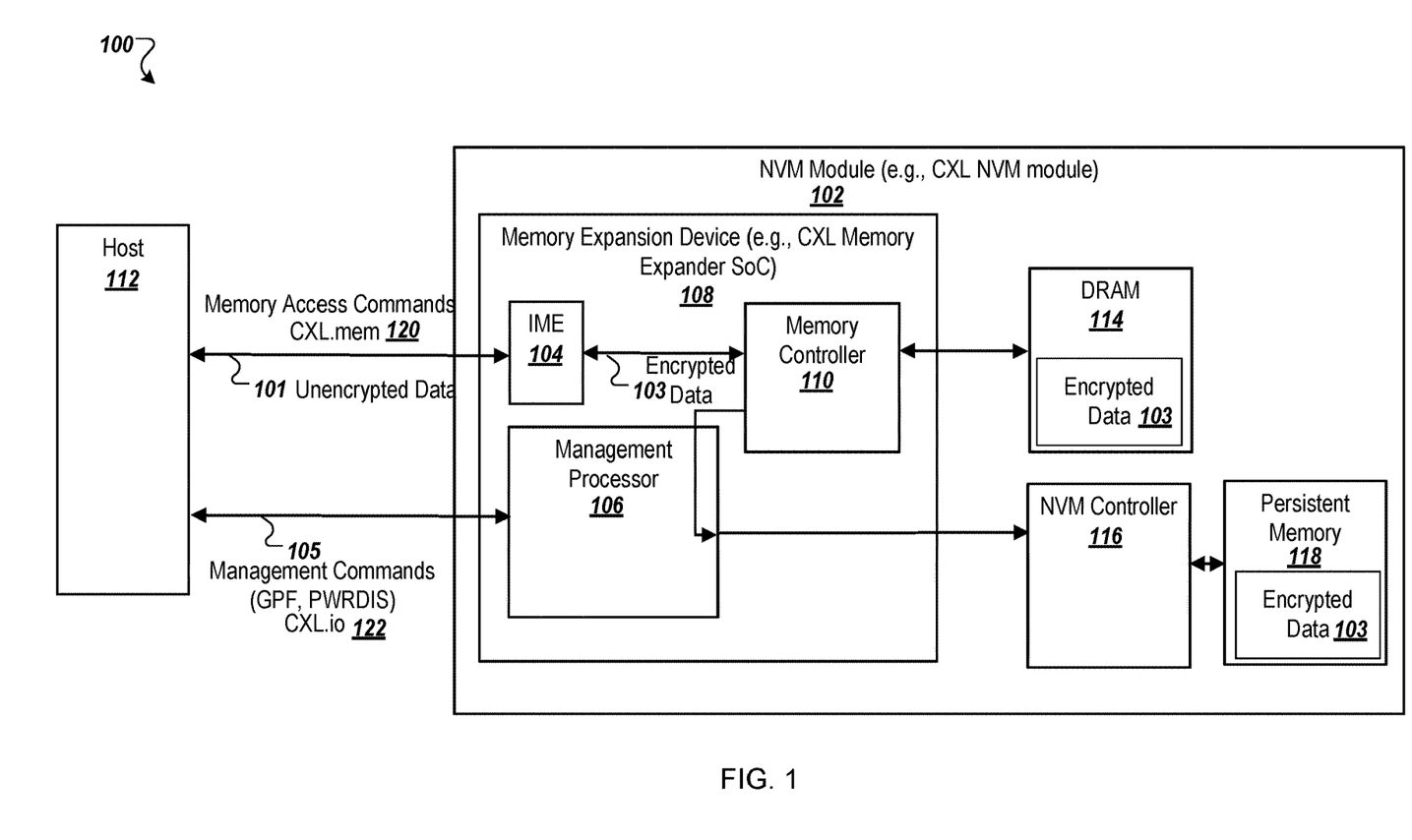
FIG. 1 is a block diagram of a memory system with an NVM module 102 with an inline memory encryption (IME) circuit according to at least one embodiment.

FIG. 1 is a block diagram of a memory system 100 with an NVM module 102 with an inline memory encryption (IME) circuit 104 according to at least one embodiment. To securely protect data against malicious attacks and securely transfer data via a management processor 106, the IME circuit 104 is implemented in a memory expansion device 108, including the management processor 106, the IME circuit 104, and a memory controller 110. In at least one embodiment, the memory expansion device 108 is a CXL memory expander SoC of a CXL NVM module. The memory expansion device 108 can encrypt unencrypted data 101 (or data encrypted only during transmission across the link), received from a host 112, using the IME circuit 104 to obtain encrypted data 103 before storing the encrypted data 103 in DRAM 114. In at least one embodiment, the IME circuit 104 is an IME engine. In another embodiment, the IME circuit 104 is an encryption circuit or encryption logic. The memory controller 110 can receive the encrypted data 103 from the IME circuit 104 and store the encrypted data 103 in the DRAM 114. It should be noted that the memory expansion device 108 can receive unencrypted data, but can also receive data that is encrypted as it traverses a link (e.g., the CXL link). This encryption is usually a link encryption, generally referred to in CXL as integrity and data encryption. The link encryption in this case would not persist to DRAM as the CXL controller in the module can decrypt the link data and verify its integrity prior to the flow described herein where the IME circuit 104 encrypts the data. Although "unencrypted data 101" is used herein, in other embodiments, the data can be encrypted data that is encrypted by the memory expansion device 108 using a key only used for the link and thus cleartext data exists within the SoC after the CXL controller and thus needs to be encrypted by the IDE circuit 104 to provide encryption for data at rest.

The NVM module 102 has persistent memory backup capabilities where the management processor 106 can access the encrypted data 103 and transfer the encrypted data 103 from the DRAM 114 to persistent memory 118 in the event of a power-down event or a power-loss event. In at least one embodiment, the management processor 106 receives a notification signal 105 associated with the power-down event or the power-loss event. The notification signal 105 can be a management command, or part of a management command, such as a GPF signal or a PWRDIS signal, received through a command interface between the host 112 and the management processor 106. In response to the notification signal 105, the management processor 106 can access the encrypted data 103 stored in the DRAM 114 and transfer the encrypted data 103 from the DRAM 114 to the persistent memory 118. The encrypted data 103 in the persistent memory 118 is considered data at rest. In at least one embodiment, the management processor 106 transfers the encrypted data to the persistent memory 118 using an NVM controller 166 (e.g., NAND controller). Because the attacker cannot interpret encrypted data correctly, the management processor 106 can access the encrypted DRAM contents and transfer the encrypted DRAM contents to the persistent memory 118 without exposing the data to probing on the lines between the memory expansion device 108 and the persistent memory 118.

In at least one embodiment, the memory expansion device 108 includes two interfaces, a host memory interface 120 (e.g., CXL.mem) and a management interface 122 (e.g., CLX.io). The host memory interface 120 can receive, from the host 112, one or more memory access commands of a remote memory protocol (e.g., CXL, Gen-Z, OMI, OpenCAPI, or the like). The management interface 122 can receive, from the host 112, one or more management commands of the remote memory protocol. The notification signal 105 can be sent as one of the management commands or part of one of the management commands. In at least one embodiment, the management command with the notification signal is a GPF command or a PWRDIS command.

In at least one embodiment, the IME circuit 104 receives a data stream from a host 112 and encrypts the data stream into the encrypted data 103, and provides the encrypted data 103 to the memory controller 110. The memory controller 110 stores the encrypted data 103 in the DRAM 114. The management processor 106, responsive to the notification signal 105 associated with the power-loss or power-down event, transfers the encrypted data 103 from the DRAM 114 to the persistent memory 118.

As illustrated in FIG. 1, the NVM module 102 can securely save DRAM contents to the persistent memory 118 through the management processor 106. All data contents from the host 112 are saved to DRAM 114 after encryption by the IME circuit 104. Although the management processor 106 is allowed to access DRAM contents, the management processor 106 accesses encrypted data 103 (not unencrypted data 101). Therefore, all malicious attacks via the management processor 106 can access the encrypted data 103 only, protecting the unencrypted data 101 against the malicious attack. The management processor 106 sends encrypted data 103 to the persistent memory 118 via the NVM controller 116, so the unencrypted data 101 is not exposed to probing the lines by an attacker.

Figure 2:
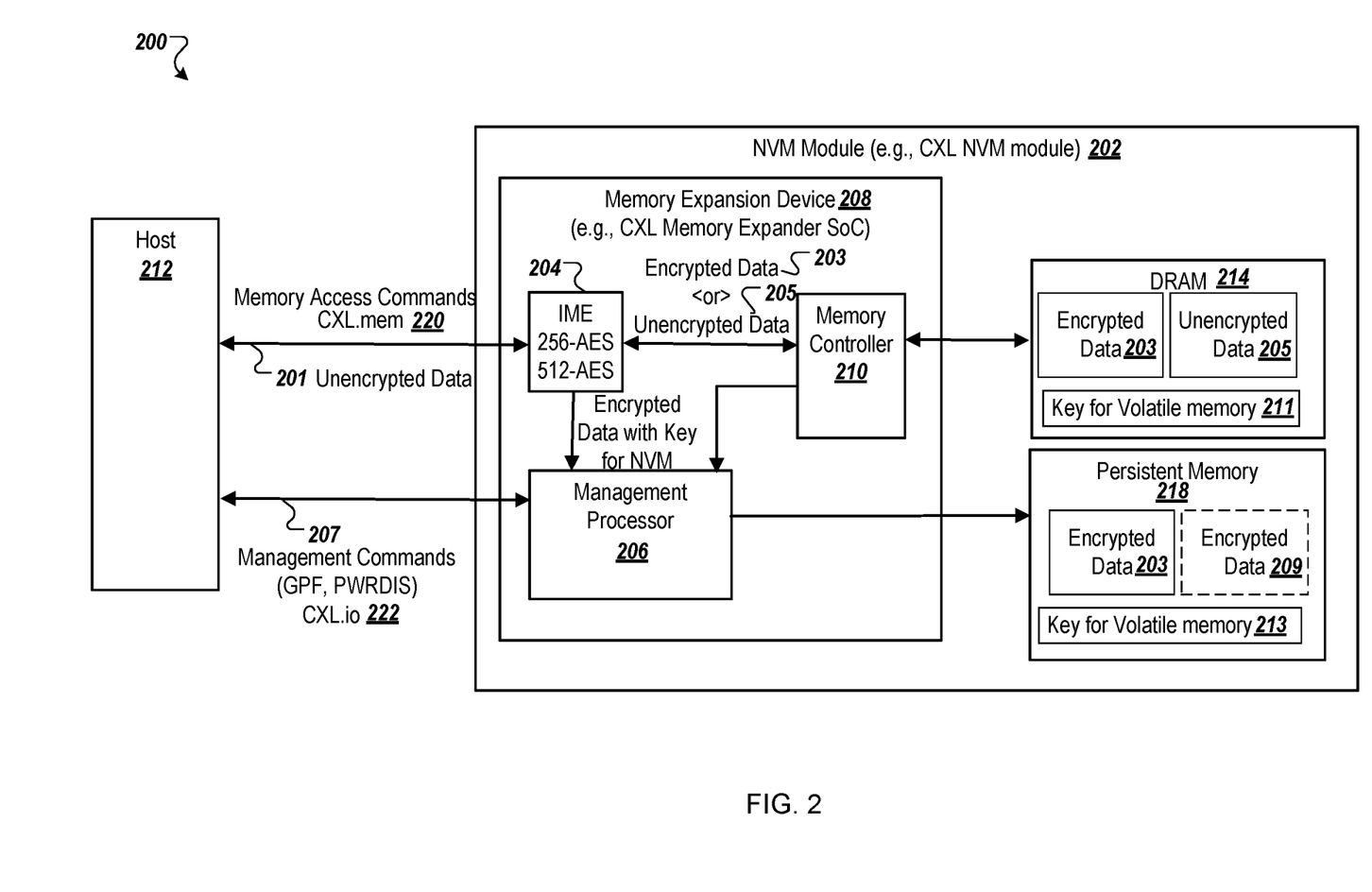
FIG. 2 is a block diagram of a memory system with an NVM module with an IME circuit with two encryption functions according to at least one embodiment.

FIG. 2 is a block diagram of a memory system 200 with an NVM module 202 with an IME circuit 204 with two encryption functions according to at least one embodiment. The memory system 200 includes a memory expansion device 208, DRAM 214, and persistent memory 218. The memory expansion device 208 includes the IME circuit 204, a memory controller 210, and a management processor 206. In at least one embodiment, the memory expansion device 208 is a CXL memory expander SoC of a CXL NVM module. The memory system 200 is similar to the memory system 100 as noted by similar reference numbers, except the memory expansion device 208 can encrypt the unencrypted data 201, received from a host 212, using the IME circuit 104 to obtain encrypted data 203 before storing the encrypted data 203 in DRAM 214, or pass the unencrypted data 201 to the memory controller 210 as-is for storing unencrypted data 205 in DRAM 214. In at least one embodiment, the IME circuit 204 is an IME engine. In another embodiment, the IME circuit 204 is an encryption circuit or encryption logic. In at least one embodiment, the IME circuit 204 includes a bypass circuit to pass unencrypted data 205 to the memory controller 210 for storing the unencrypted data 205 in DRAM 214. The IME circuit 204 can include multiple encryption functions, such as a first encryption function that uses 256-AES encryption and a second encryption function that uses 512-AES encryption. In other embodiments, the encryption functions can also provide cryptographic integrity, such as using a message authentication code (MAC). In other embodiments, the cryptographic integrity can be provided separately from the encryption function. In some cases, the strength of the MAC and encryption algorithms can be different. In at least one embodiment, the MAC can be calculated on a first encrypted data stored with a second encrypted data as part of the algorithm (e.g., AES) or separately with a different algorithm. The memory controller 210 can receive the encrypted data 203 or the unencrypted data 205 from the IME circuit 204 and store the encrypted data 203 in the DRAM 114 or the unencrypted data 205 from the IME circuit 204. The host-to-unencrypted memory path can bypass the IME circuit 204 for all host transactions. In at least one embodiment, the encryption can be serialized (e.g., a first time for memory (DRAM) storage and a second time with a second standard for persistent storage. As described herein, the keys can be stored in persistent memory storage. The persistent memory storage can be used to securely store and restore the encrypted contents of the DRAM to a previous state that can be accessed by the host and restore the keys necessary to decrypt this data.

The NVM module 202 has persistent memory backup capabilities where the management processor 206 can access the encrypted data 203 and transfer the encrypted data 203 from the DRAM 214 to persistent memory 218 in the event of a power-down event or a power-loss event. In at least one embodiment, the management processor 206 receives a notification signal 207 associated with the power-down or power-loss events. The notification signal 207 can be a management command, or part of a management command, such as a GPF signal or a PWRDIS signal, received through a command interface between the host 212 and the management processor 206. In response to the notification signal 207, the management processor 206 can access the encrypted data 203 stored in the DRAM 114 and transfer the encrypted data 203 from the DRAM 214 to the persistent memory 218 in a similar manner as described above with respect to FIG. 1. The management processor 206 can also cause the unencrypted data 205 (or encrypted by a first standard as described herein) to be encrypted by the IME circuit 204 to obtain encrypted data 209 before transferring it to the persistent memory 218 to be stored in response to the notification signal 207. In at least one embodiment, the management processor 206 causes the memory controller 210 to retrieve the unencrypted data 205 from the DRAM 214 and send the unencrypted data 205 to the IME circuit 204. The management processor 206 can cause the IME circuit 204 to switch output terminals into input terminals to receive the unencrypted data 205. The unencrypted data 205 is encrypted by the IME circuit 204 with an encryption function and sends encrypted data 209 to the management processor 206. The management processor 206 transfers the encrypted data 209 to the persistent memory 218. The encrypted data 203 and encrypted data 209 in the persistent memory 118 are considered data at rest. In at least one embodiment, the management processor 206 transfers the encrypted data (203, 209) to the persistent memory 218 using an NVM controller (not illustrated in FIG. 2). Because the attacker cannot interpret encrypted data correctly, the management processor 206 can access the encrypted DRAM contents (or cause the unencrypted DRAM contents to be encrypted) and transfer the encrypted DRAM contents to the persistent memory 218 without exposing the data to probing on the lines between the memory expansion device 208 and the persistent memory 218.

In another embodiment, the memory expansion device 208 receives unencrypted data 201 from the host 212. The IME circuit 204 encrypts the unencrypted data 201, received from the host 212, using a first encryption function of the IME circuit 204 to obtain encrypted data 203 before storing the encrypted data 203 in DRAM 214. The first encryption function can have a first encryption strength, such as 256-AES encryption. In at least one embodiment, the IME circuit 204 is an IME engine with two encryption functions. In another embodiment, the IME circuit 204 includes two separate IME engines, each having one of the two encryption functions. In another embodiment, the IME circuit 204 includes a first encryption circuit for the first encryption function and a second encryption circuit for the second encryption function. Alternatively, additional encryption functions can be implemented in the IME circuit 204. The memory controller 210 can receive the encrypted data 203 from the IME circuit 204 and store the encrypted data 203 in the DRAM 214 from the IME circuit 204. The management processor 206 can receive the notification signal 207. In response to the notification signal 207, the management processor 206 can cause the encrypted data 203 to be further encrypted by the IME circuit 204 to obtain encrypted data 209 before transferring it to the persistent memory 218 to be stored in response to the notification signal 207. In at least one embodiment, the management processor 206 causes the memory controller 210 to retrieve the encrypted data 203 from the DRAM 214 and send the encrypted data 203 to the IME circuit 204. The management processor 206 can cause the IME circuit 204 to switch output terminals into input terminals to receive the encrypted data 203. The IME circuit 204 encrypts the encrypted data 203, received from the DRAM 214, using a second encryption function of the IME circuit 204 to obtain encrypted data 209 before storing the encrypted data 209 in DRAM 214. The encrypted data 209 in the persistent memory 218 is considered data at rest. In at least one embodiment, the management processor 206 transfers the encrypted data 209 to the persistent memory 218 using an NVM controller (not illustrated in FIG. 2). Because the attacker cannot interpret encrypted data correctly, the management processor 206 can cause the encrypted DRAM contents to be further encrypted and transfer the encrypted DRAM contents to the persistent memory 218 without exposing the unencrypted data 201 (or the encrypted data 203) to probing on the lines between the memory expansion device 208 and the persistent memory 218.

In at least one embodiment, the memory expansion device 208 includes two interfaces, a host memory interface 220 (e.g., CXL.mem) and a management interface 222 (e.g., CLX.io). The host memory interface 220 can receive, from the host 212, one or more memory access commands of a remote memory protocol (e.g., CXL, Gen-Z, OMI, OpenCAPI, or the like). The management interface 222 can receive, from the host 112, one or more management commands of the remote memory protocol. The notification signal 207 can be sent as one of the management commands or part of one of the management commands. In at least one embodiment, the management command with the notification signal is a GPF command or a PWRDIS command.

In at least one embodiment, the IME circuit 204 receives a data stream from a host 212, encrypts the data stream into the encrypted data 203, and provides the encrypted data 203 to the memory controller 210. The memory controller 210 stores the encrypted data 203 in the DRAM 214. The management processor 206, responsive to the notification signal 207 associated with the power-loss or power-down event, transfers the encrypted data 203 from the DRAM 214 to the persistent memory 118 (also referred to as persistent storage memory).

As illustrated in FIG. 2, the NVM module 202 can securely save DRAM contents to the persistent memory 218 through the management processor 206. All data contents from the host 212 are saved to DRAM 214 after encryption by the IME circuit 204. In some cases, the management processor 206 can access DRAM contents so long as the DRAM contents are encrypted. In other cases, the management processor 206 is not allowed access to the DRAM contents, and the DRAM contents are transferred to the management processor 206 after being encrypted by the IME circuit 204. Therefore, all malicious attacks via the management processor 206 can access the encrypted data only, protecting the unencrypted data 201 against the malicious attack. The management processor 206 sends encrypted data to the persistent memory 118, so the unencrypted data 201 is not exposed to probing the lines by an attacker.

In at least one embodiment, the IME circuit 204 includes a first set of terminals configured as inputs in a first mode and a second set of terminals configured as outputs in the first mode. The second mode can correspond to a period after the notification signal 207 is received by the management processor 206. The management processor 206 can switch the first set of terminals to be configured as outputs in a second mode and the second set of terminals to be configured as inputs in response to the notification signal 207.

In at least one embodiment, the IME encrypts the unencrypted data 201 with a first encryption function. The management processor 206, responsive to the notification signal 207, can cause the memory controller 210 to retrieve the encrypted data 203 (or the unencrypted data 205) from the DRAM 214 and send the encrypted data 203 to the IME circuit 204. The management processor 206, responsive to the notification signal 207, can cause the IME circuit 204 to encrypt the encrypted data 203 with a second encryption function to obtain second encrypted data 209. The management processor 206 can store the second encrypted data 209 into the persistent storage memory 218.

In at least one embodiment, the second encryption function has a higher encryption strength (or a higher encryption level) than the first encryption function. In at least one embodiment, the first encryption function uses a first encryption key 211 for volatile memory. The first encryption key 211 can be stored in an SRAM private to the IME circuit 204. The first encryption key 211 can be stored in SoC memory or SoC-accessible memory. The second encryption function uses a second encryption key 213, different from the first encryption key 211. The second encryption key 213 can be stored in an SRAM private to the IME circuit 204. The first encryption key 211 and second encryption key 213 can be encrypted and integrity protected prior to writing to the SRAM or SoC memory that is accessible by the root of trust. In another embodiment, the first encryption key 211 and second encryption key 213 can be encrypted and integrity protected prior to writing to the persistent memory 218.

In at least one embodiment, the second encryption key 213 can be stored in the persistent memory 218 responsive to the notification signal 207. In at least one embodiment, the first encryption key 211, the second encryption key 213, or both are encrypted into encrypted keys before being stored in the DRAM 214 and persistent memory 218, respectively. In at least one embodiment, the memory expansion device 208 includes a root of trust (RoT) circuit that accepts the second encryption key 213, encrypts the second encryption key 213 into an encrypted key, and stores the encrypted key in the persistent memory 218. For example, the NVM module 202 can keep the encryption keys in the case of a power-loss or power-down event so that the encryption keys persist over a power cycle.

Figure 3:
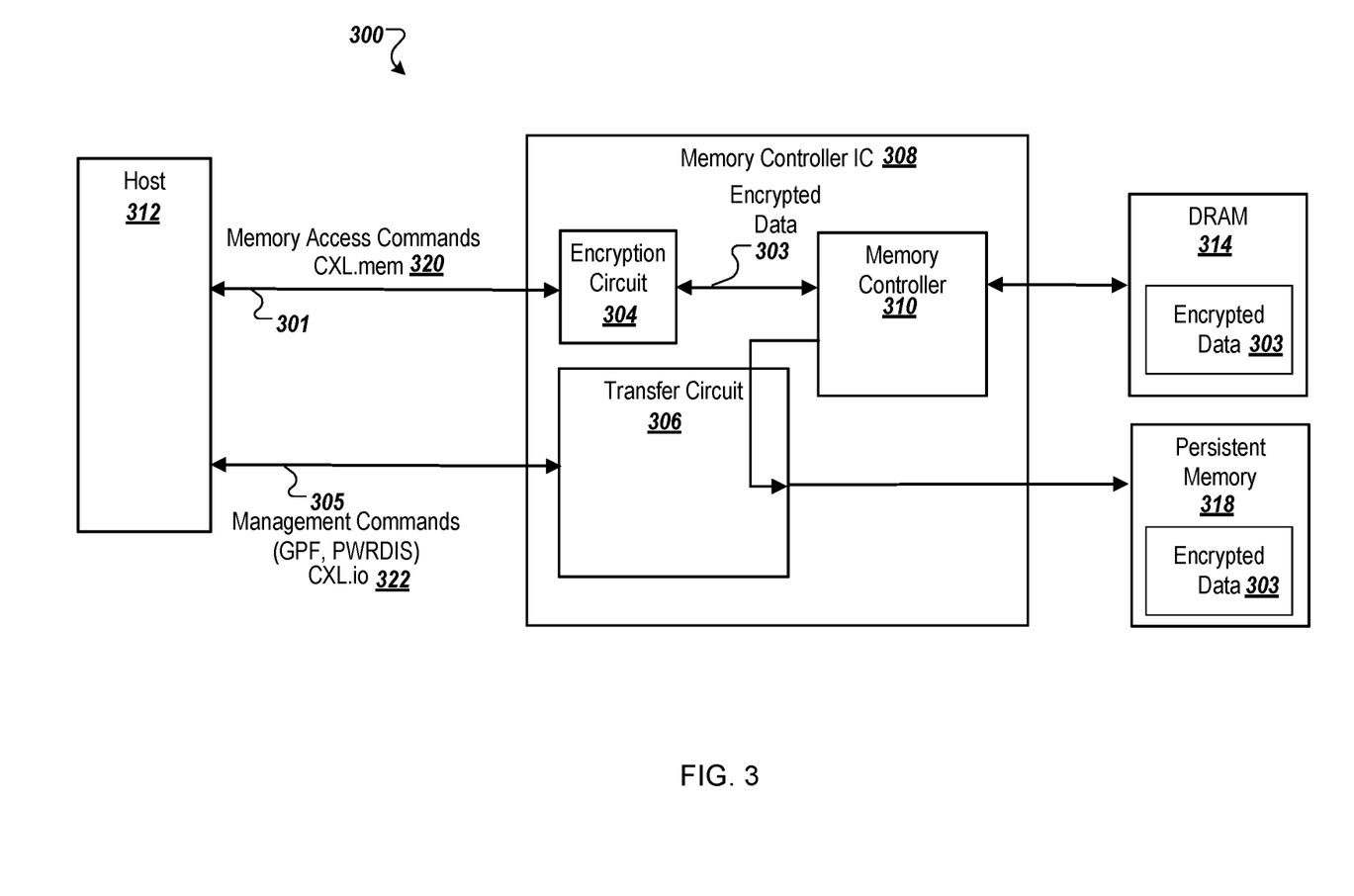
FIG. 3 is a block diagram of a memory system with a memory controller integrated circuit (IC) having an encryption circuit and a transfer circuit according to at least one embodiment.

FIG. 3 is a block diagram of a memory system 300 with a memory controller IC 308 having an encryption circuit and a transfer circuit according to at least one embodiment. The memory system 300 is similar to the memory system 100, as noted by similar reference numbers. The memory system 300 includes the memory controller IC 308 coupled between a host 312 and DRAM 314 and persistent memory 318. The memory controller IC 308 can include an encryption circuit 304, a memory controller 310, and a transfer circuit 306. The memory controller IC 308 can securely protect against malicious attacks and securely transfer data to persistent memory 318 using the transfer circuit 306. The memory controller IC 308 can encrypt unencrypted data 301, received from the host 312, using the encryption circuit 304 to obtain encrypted data 303 before storing the encrypted data 303 in DRAM 214. In at least one embodiment, the memory controller 310 can receive the encrypted data 303 from the encryption circuit 304 and store the encrypted data 303 in the DRAM 314. In the event of a power-down or power-loss event, the transfer circuit 306 can receive an indication 305 of the power-down or power-loss event. The indication 305 can be a signal, a command, information, or the like, received by the transfer circuit 306 (or received by the memory controller IC 308). In at least one embodiment, in response to the indication 305, the transfer circuit 306 can access the encrypted data 303 stored in the DRAM 214 and transfer the encrypted data 203 from the DRAM 214 to the persistent memory 218. The encrypted data 203 in the persistent memory 118 is considered data at rest. In at least one embodiment, the transfer circuit 306 transfers the encrypted data 303 to the persistent memory 318 using an NVM controller (not illustrated in FIG. 3). Because the attacker cannot interpret encrypted data correctly, the transfer circuit 306 can access the encrypted DRAM contents and transfer the encrypted DRAM contents to the persistent memory 318 without exposing the data to probing on the lines between the memory controller IC 308 and the persistent memory 318.

In at least one embodiment, the memory controller IC 308 includes two interfaces, a host memory interface 320 (e.g., CXL.mem) and a management interface 322 (e.g., CLX.io). The host memory interface 320 can receive, from the host 312, one or more memory access commands of a remote memory protocol (e.g., CXL, Gen-Z, OMI, OpenCAPI, or the like). The management interface 322 can receive, from the host 312, one or more management commands of the remote memory protocol. The indication 305 can be sent as one of the management commands or part of one of the management commands. In at least one embodiment, the management command with the notification signal is a GPF signal/command or a PWRDIS signal/command. In another embodiment, the memory controller IC 308 can include one interface or more than two interfaces for interacting with the host 312.

In at least one embodiment, the encryption circuit 304 receives a data stream from a host 312 and encrypts the data stream into the encrypted data 303, and provides the encrypted data 303 to the memory controller 310. The memory controller 310 stores the encrypted data 303 in the DRAM 314. The transfer circuit 306, responsive to the indication 305 associated with the power-loss or power-down event, transfers the encrypted data 303 from the DRAM 314 to the persistent memory 318.

As illustrated in FIG. 3, the memory controller IC 308 can securely save DRAM contents to the persistent memory 318 through the transfer circuit 306. All data contents from the host 312 are saved to DRAM 314 after encryption by the encryption circuit 304. Although the transfer circuit 306 is allowed to access DRAM contents, the transfer circuit 306 accesses encrypted data 303 (not unencrypted data 301). Therefore, all malicious attacks via the transfer circuit 306 can only access the encrypted data 303, protecting the unencrypted data 301 against the malicious attack. The transfer circuit 306 sends encrypted data 303 to the persistent memory 318, so the unencrypted data 301 is not exposed to probing the lines by an attacker.

In another embodiment, the memory controller IC 308 is part of a memory module that supports a remote memory protocol. The memory module can include one or more volatile memory devices, such as DRAM devices, and one or more NVM devices for the persistent memory 318. The non-volatile memory devices can be on-board NVM devices. The encryption circuit 304 can encrypt first data, received from the host device 313, into first encrypted data. The memory controller 310, coupled to the one or more volatile memory devices and the encryption circuit 304, can store the first encrypted data in the one or more volatile memory devices. The transfer circuit 306 is coupled to the memory controller 310 and the one or more NVM devices. The transfer circuit 306, in response to the indication 305 (e.g., notification signal), can transfer the first encrypted data from the one or more volatile memory devices to the one or more non-volatile memory devices.

In at least one embodiment, the encryption circuit 304 can receive second data from the one or more volatile memory devise (e.g., DRAM 314) and encrypt the second data into second encrypted data. The transfer circuit 306 can transfer the second encrypted data to the one or more non-volatile memory devices in response to the indication 305. In some embodiments, the second data received from the one or more volatile memory devices is unencrypted data. In some embodiments, the second data received from the one or more volatile memory devices is encrypted data, encrypted by a first encryption function. In some embodiments, a portion of the data in the volatile memory devices can be encrypted and a portion can be unencrypted. The encryption circuit can encrypt both portions and store into a persistent non-volatile memory device. The encrypted data, received from the one or more volatile memory devices, can be encrypted using a first encryption strength, and the second encrypted data is encrypted by the encryption circuit 304 using a second encryption strength greater than the first encryption strength.

Figure 4:
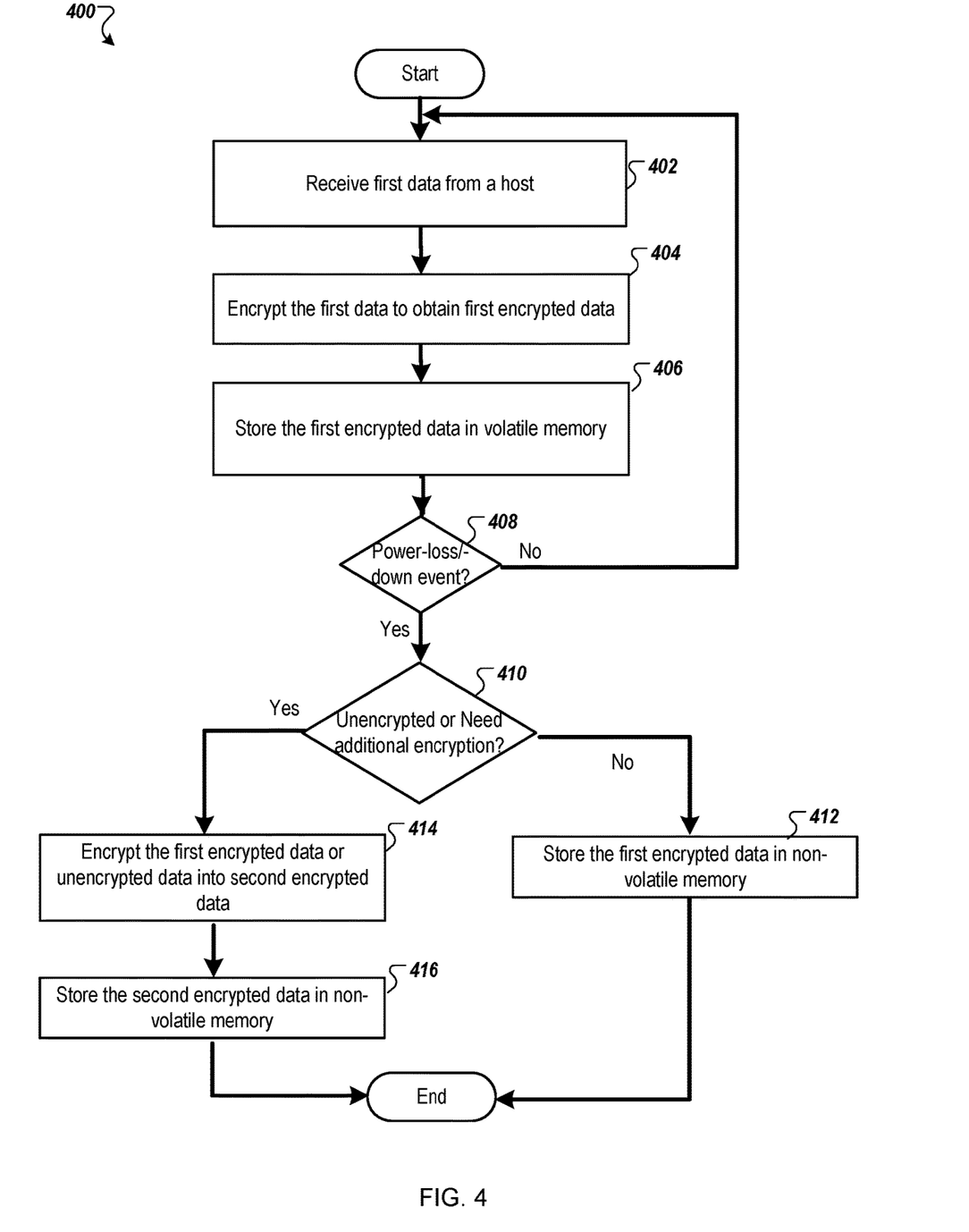
FIG. 4 is a flow diagram of a method of transferring data from volatile memory to non-volatile memory securely according to at least one embodiment.

FIG. 4 is a flow diagram of a method 400 of transferring data from volatile memory to non-volatile memory securely according to at least one embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by the memory expansion device 108 of FIG. 1, the memory expansion device 208 of FIG. 2, the memory controller IC 308 of FIG. 3, or the like.

Referring to FIG. 4, the method 400 begins by the processing logic receiving first data from a host (block 402). The processing logic encrypts the first data to obtain first encrypted data (block 404). The processing logic stores the first encrypted data in volatile memory (block 406). The processing logic determines whether there is a power-loss/-down event (block 408). In at least one embodiment, the processing logic receives a notification signal or a command with an indication of the power-loss/-down event as described herein. When there is no power-loss/-down event at block 408, the processing logic returns to continue receiving data from the host.

When there is a power-loss/-down event at block 408, the processing logic can determine whether the data in the volatile memory is unencrypted or needs additional encryption (block 410). The processing logic can use a memory map table or regions of memory to determine what data is unencrypted and what data is encrypted. The processing logic can use a mode signal or a setting to indicate whether the encrypted data in volatile memory needs additional encryption (e.g., a higher encryption level) to be stored in non-volatile memory. If the data is not encrypted or does not require additional encryption at block 410, the processing logic stores the first encrypted data in non-volatile memory (block 412), and the method 400 ends.

If the data is unencrypted or does require additional encryption at block 410, the processing logic encrypts the first encrypted data or the unencrypted data into second encrypted data (block 414). The processing logic stores the second encrypted data in non-volatile memory (block 416), and the method 400 ends.

Figure 5:
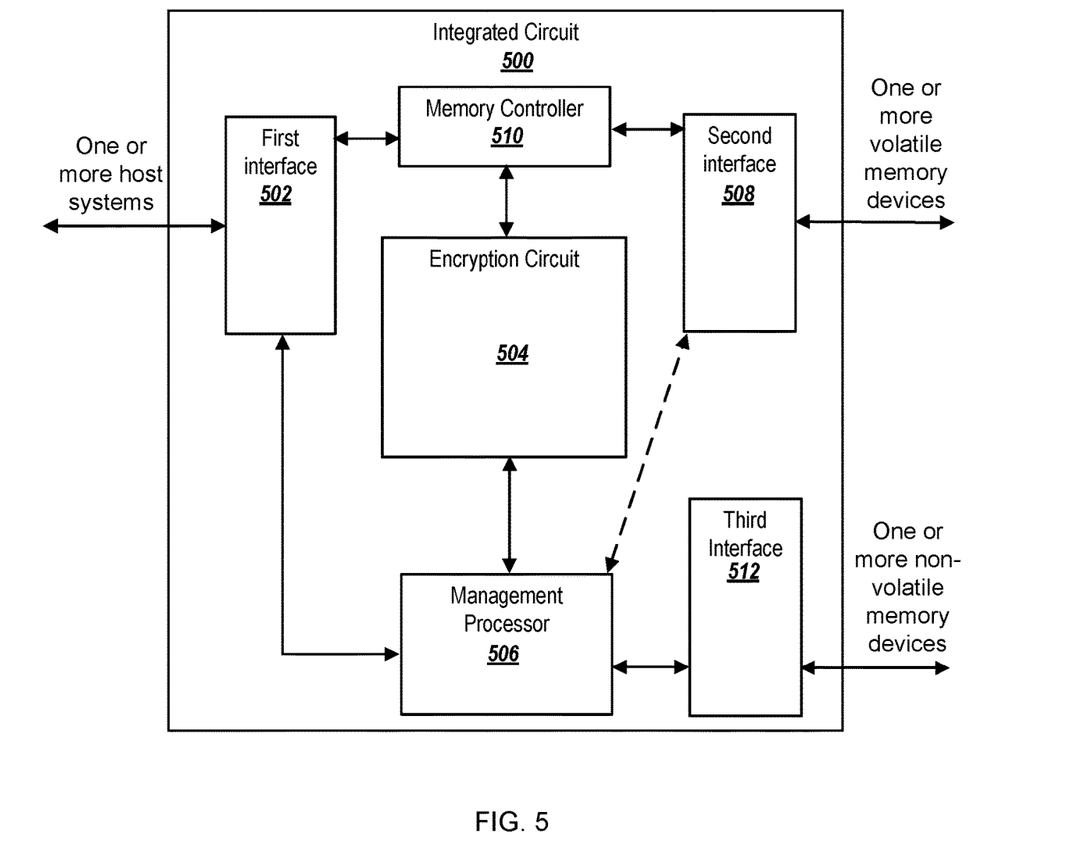
FIG. 5 is a block diagram of an integrated circuit with a memory controller, an encryption circuit, and a management processor according to at least one embodiment.

FIG. 5 is a block diagram of an integrated circuit 500 with a memory controller 510, an encryption circuit 504, and a management processor 505 according to at least one embodiment. In at least one embodiment, the integrated circuit 500 is a controller device that can communicate with one or more host systems (not illustrated in FIG. 5) using a cache-coherent interconnect protocol (e.g., the Compute Express Link™ (CXL™) protocol). The integrated circuit 500 can be a device that implements the CXL™ standard. The CXL™ protocol can be built upon physical and electrical interfaces of a PCI Express® standard with protocols that establish coherency, simplify the software stack, and maintain compatibility with existing standards. The integrated circuit 500 includes a first interface 502 coupled to the one or more host systems, a second interface 508 coupled to one or more volatile memory devices (not illustrated in FIG. 5), and a third interface 512 coupled to one or more non-volatile memory devices (not illustrated in FIG. 5). The one or more volatile memory devices can be DRAM devices. The integrated circuit 500 can be part of a single-host memory expansion integrated circuit, a multi-host memory pooling integrated circuit coupled to multiple host systems over multiple cache-coherent interconnects, or the like.

In one embodiment, the memory controller 510 receives unencrypted data from a host over the first interface 502. The memory controller 510 can send the unencrypted data to the encryption circuit 504. The encryption circuit 504 encrypts the unencrypted data to obtain encrypted data. The encryption circuit 504 sends the encrypted data back to the memory controller 501, which stores the encrypted data in one or more volatile memory devices over the second interface 508. The management processor 506 can receive a signal associated with a power-loss event or power-down event over the first interface 502 from the one or more host systems. The management processor 506 can retrieve the encrypted data from the one or more volatile memory devices and send the encrypted data to the one or more non-volatile memory devices over the third interface 512 in response to the signal. In at least one embodiment, the management processor 506 retrieves the encrypted data over the second interface 508 using the memory controller 510.

In another embodiment, the memory controller 510 receives unencrypted data from a host over the first interface 502. As described herein, the memory controller 510 can receive encrypted data from the host over the first interface 502, where the encrypted data is encrypted with link encryption that protects data in flight over the host interface 502. The memory controller 510 can decrypt this data and have access to unencrypted data before beginning the sequence described herein. The memory controller 510 can store the unencrypted data in one or more volatile memory devices over the second interface 508. The management processor 506 can receive a signal associated with a power-loss event or power-down event over the first interface 502 from the one or more host systems. The management processor 506 can request the unencrypted data from the one or more volatile memory devices via the memory controller 510. The memory controller 510 sends the unencrypted data to the encryption circuit 504, and the encryption circuit 504 encrypts the unencrypted data to obtain encrypted data. The encryption circuit 504 sends the encrypted data to the management processor 506. The management processor 506 sends the encrypted data to the one or more non-volatile memory devices over the third interface 512.

In one embodiment, the memory controller 510 receives unencrypted data from a host over the first interface 502. The memory controller 510 can send the unencrypted data to the encryption circuit 504. The encryption circuit 504 encrypts the unencrypted data using a first encryption function to obtain first encrypted data. The encryption circuit 504 sends the first encrypted data back to the memory controller 501, which stores the first encrypted data in one or more volatile memory devices over the second interface 508. The management processor 506 can receive a signal associated with a power-loss event or power-down event over the first interface 502 from the one or more host systems. The management processor 506 can request the first encrypted data using the memory controller 510. The memory controller 510 sends the first encrypted data to the encryption circuit 504. The encryption circuit 504 encrypts the first encrypted data using a second encryption function to obtain second encrypted data. The encryption circuit 504 sends the second encrypted data to the management processor 506.

The management processor 506 sends the second encrypted data to the one or more non-volatile memory devices over the third interface 512. In this embodiment, the management processor 506 cannot retrieve the unencrypted data directly over the second interface 508 without using the memory controller 510. In at least one embodiment, the first encryption function uses a first key and the second encryption function uses a second encryption key. The first and second encryption keys can be different encryption keys. The first and second encryption functions can have different encryption strengths. The first and second encryption keys can be stored in the respective memory. The first and second encryption keys can be encrypted before being stored in the respective memory.

In at least one embodiment, the management processor 506 can cause the memory controller 510 to retrieve data from the one or more volatile memory devices. In other embodiments, the management processor 506 can directly access one or more volatile memory devices via the second interface 508. In at least one embodiment, the management processor 506 can cause the encryption circuit 504 to encrypt data using the first encryption function, the second encryption function, or both.

In another embodiment, the integrated circuit 500 is a processor that implements the CXL™ standard and includes the encryption circuit 504 and memory controller 510. In another embodiment, the integrated circuit 500 can include more or fewer interfaces than three.

In at least one embodiment, the management processor can transfer the encrypted data in the persistent storage memory back to the DRAM to be accessible by the host. This can be performed in response to a restore operation or automatically when power is restored. When transferring data to the DRAM from the persistent storage memory, the encrypted data is accessed by the management processor and written back to the DRAM. If the keys are encrypted and stored in persistent storage memory, the keys can be decrypted and used to decrypt the encrypted DRAM contents when accessed by the host. The host's data can be transferred to the DRAM from persistent storage memory securely without being accessible by the management processor and without exposing the host's data on lines between an external NVM controller and the SoC. If the encrypted data was encrypted a second time for storage to the persistent storage memory where the NVM storage encryption key is recalled from persistent storage memory, the IME keys can also be restored. In at least one embodiment, the keys are decrypted and checked for integrity (message authentication code (MAC)) as part of the flow.

It is to be understood that the above description is intended to be illustrative and not restrictive. Many other implementations will be apparent to those of skill in the art upon reading and understanding the above description. Therefore, the disclosure scope should be determined with reference to the appended claims, along with the full scope of equivalents to which such claims are entitled.

In the above description, numerous details are set forth. It will be apparent, however, to one skilled in the art that the aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A memory module with persistent memory backup capability, the memory module comprising:
   dynamic random access memory (DRAM);
   persistent storage memory;
   an inline memory encryption (IME) circuit to receive an unencrypted data stream from a host, encrypt the unencrypted data stream into an encrypted data stream, and store the encrypted data stream in the DRAM, wherein the IME, to encrypt the unencrypted data stream into the encrypted data stream, is to encrypt unencrypted data of the unencrypted data stream into first encrypted data of the encrypted data stream and store the first encrypted data in the DRAM before the unencrypted data of the unencrypted data stream has been stored in the DRAM; and
   a management processor to transfer the first encrypted data from the DRAM to the persistent storage memory responsive to a signal associated with a power-loss event or a power-down event, wherein the management processor, to transfer the first encrypted data from the DRAM to the persistent storage memory, is to:
   cause the first encrypted data to be sent to the IME; and
   cause the IME to encrypt the first encrypted data into second encrypted data before storing the second encrypted data in the persistent storage memory.

2. The memory module of claim 1, further comprising a memory controller coupled to the IME circuit and the management processor.

3. The memory module of claim 2, further comprising a System on Chip (SoC) comprising the IME circuit, the management processor, and the memory controller.

4. The memory module of claim 3, wherein the SoC is a memory expansion device.

5. The memory module of claim 1, wherein the IME circuit comprises a first set of terminals configured as inputs in a first mode and a second set of terminals configured as outputs in the first mode, and wherein the management processor, responsive to the signal, is to switch the first set of terminals to be configured as outputs in a second mode and the second set of terminals to be configured as inputs.

6. The memory module of claim 5, further comprising a memory controller coupled to the IME circuit and the management processor, wherein the first encrypted data is encrypted by the IME circuit with a first encryption function, and wherein the management processor transferring the first encrypted data from the DRAM to the persistent storage memory responsive to the signal further comprises:
   causing the first encrypted data to be sent to the IME by causing the memory controller to retrieve the first encrypted data from the DRAM and send the first encrypted data to the IME circuit; and
   causing the IME circuit to encrypt the first encrypted data into second encrypted data by causing the IME circuit to encrypt the first encrypted data with a second encryption function to obtain the second encrypted data.

7. The memory module of claim 6, wherein the second encryption function has a higher encryption strength than the first encryption function.

8. The memory module of claim 6, wherein the first encryption function uses a first encryption key, and wherein the second encryption function uses a second encryption key different than the first encryption key.

9. The memory module of claim 1, wherein an encryption key of the IME circuit is stored in the persistent storage memory responsive to the signal.

10. The memory module of claim 9, wherein the encryption key is encrypted into an encrypted key before being stored in the persistent storage memory.

11. The memory module of claim 1, further comprising:
   a memory expansion device comprising the IME circuit, the management processor, and a memory controller;
   a host interface to receive, from a host, one or more memory access commands of a remote memory protocol; and
   a management interface to receive, from the host, one or more management commands of the remote memory protocol, wherein the signal is at least one of a global persistent flush (GPF) command or a power disappear (PWRDIS) command.

12. A memory expansion device comprising:
an inline memory encryption (IME) circuit to receive an unencrypted data stream from a host and encrypt the unencrypted data stream into an encrypted data stream, and send the encrypted data stream to be stored in volatile memory coupled to the memory expansion device, wherein the IME, to encrypt the unencrypted data stream into the encrypted data stream, is to encrypt unencrypted data of the unencrypted data stream into first encrypted data of the encrypted data stream and send the first encrypted data stream to be stored in the volatile memory coupled to the memory expansion device before the unencrypted data of the unencrypted data stream has been stored in the volatile memory coupled to the memory expansion device;
a memory controller coupled to the IME circuit, the memory controller to receive the first encrypted data from the IME circuit and store the first encrypted data in the volatile memory coupled to the memory expansion device; and
a management processor coupled to the memory controller, the management processor to receive a management command associated with a power-loss or power-down event and transfer the first encrypted data from the volatile memory to non-volatile memory coupled to the memory expansion device responsive to the management command, wherein the management processor, to transfer the first encrypted data from the volatile memory to the non-volatile memory, is to:
cause the memory controller to retrieve the first encrypted data from the volatile memory and send the first encrypted data to the IME circuit; and
cause the IME circuit to encrypt the first encrypted data into second encrypted data before storing the second encrypted data into the non-volatile memory.

13. The memory expansion device of claim 12, wherein the IME circuit comprises a first set of terminals configured as inputs in a first mode and a second set of terminals configured as outputs in the first mode, and wherein the management processor, responsive to the management command, is to switch the first set of terminals to be configured as outputs in a second mode and the second set of terminals to be configured as inputs.

14. The memory expansion device of claim 12, wherein the IME circuit is to encrypt the unencrypted data of the unencrypted data stream into first encrypted data using a first encryption function, wherein the management processor, responsive to the management command, is to:
cause the IME circuit to encrypt the first encrypted data with a second encryption function to obtain the second encrypted data, wherein the second encryption function has a higher encryption strength than the first encryption function; and
store the second encrypted data into the non-volatile memory, wherein the first encryption function uses a first encryption key, and wherein the second encryption function uses a second encryption key different than the first encryption key.

15. The memory expansion device of claim 12, further comprising a Root of Trust (RoT) circuit to accept an IME key for the IME circuit, encrypt the IME key to obtain an encrypted IME key, and store the encrypted IME key in the non-volatile memory, responsive to the management command.

16. The memory expansion device of claim 12, further comprising:
a host interface to receive, from a host, one or more memory access commands of a remote memory protocol; and
a management interface to receive, from the host, the management command, wherein the management command is at least one of a global persistent flush (GPF) command or a power disappear (PWRDIS) command.

17. A memory module that supports a remote memory protocol, the memory module comprising:
one or more volatile memory devices;
one or more non-volatile memory devices;
an encryption circuit to receive an unencrypted data stream from a host device comprising unencrypted first data and encrypt the unencrypted first data of the unencrypted data stream into encrypted first data, and send the encrypted first data to be stored in the one or more non-volatile memory devices, wherein the encryption circuit, to encrypt the unencrypted first data of the unencrypted data stream into encrypted first data, is to encrypt the unencrypted first data of the unencrypted data stream into encrypted first data using a first encryption function and send the encrypted first data to be stored in the one or more non-volatile memory devices before the first unencrypted data of the unencrypted data stream has been stored in the one or more volatile memory devices;
a memory controller coupled to the one or more volatile memory devices and the encryption circuit, the memory controller to store the encrypted first data in the one or more volatile memory devices; and
a transfer circuit coupled to the memory controller and the one or more non-volatile memory devices, wherein the transfer circuit, in response to a notification signal, is to transfer the encrypted first data from the one or more volatile memory devices to the one or more non-volatile memory devices, wherein the transfer circuit, to transfer the encrypted first data from the one or more volatile memory devices to the one or more non-volatile memory devices in response to the notification signal, is to:
cause memory controller to retrieve the encrypted first data from the one or more volatile memory devices and send the encrypted first data to the encryption circuit; and
cause the encryption circuit to encrypt the encrypted first data with a second encryption function before storing the encrypted first data into the one or more non-volatile memory devices.

18. The memory module of claim 17, wherein the encryption circuit is to encrypt second data, received from the one or more volatile memory devices, into encrypted second data using the second encryption function, and wherein the transfer circuit is to transfer the encrypted second data to the one or more non-volatile memory devices.

19. The memory module of claim 18, wherein the second data is unencrypted data.

20. The memory module of claim 18, wherein the second data is encrypted data encrypted using a first encryption strength, and wherein the encrypted second data is encrypted using a second encryption strength greater than the first encryption strength.

* * * * *